Aug. 22, 1950  E. L. HART  2,519,569
AUTOMATIC BLEEDER FOR HYDRAULIC LINES
Filed Aug. 30, 1944  2 Sheets-Sheet 1

INVENTOR.
Elmer L. Hart
BY Richards & Geier
ATTORNEYS.

Aug. 22, 1950   E. L. HART   2,519,569
AUTOMATIC BLEEDER FOR HYDRAULIC LINES
Filed Aug. 30, 1944   2 Sheets-Sheet 2
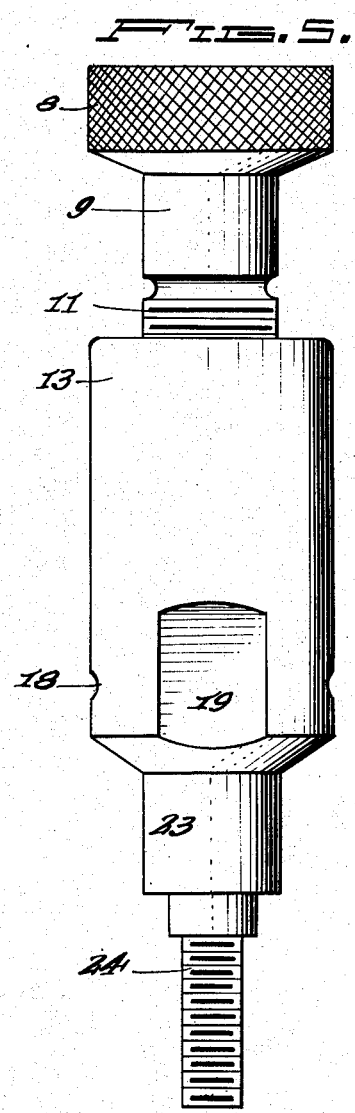
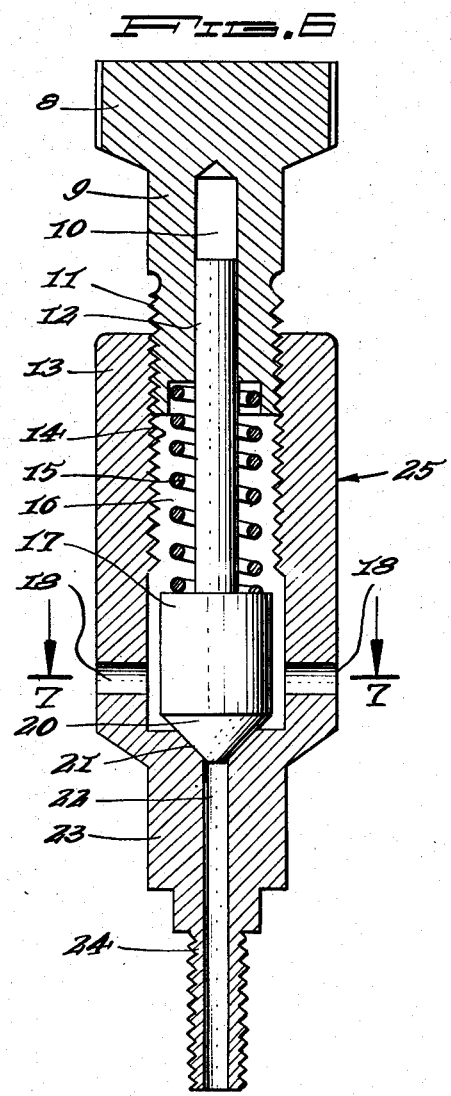
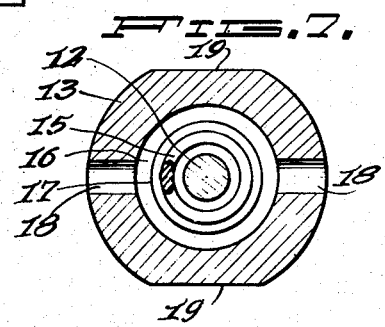
INVENTOR.
Elmer L. Hart
BY
ATTORNEYS.

Patented Aug. 22, 1950

2,519,569

UNITED STATES PATENT OFFICE 2,519,569

AUTOMATIC BLEEDER FOR HYDRAULIC LINES

Elmer L. Hart, Newark, N. J.

Application August 30, 1944, Serial No. 551,989

1 Claim. (Cl. 277—65)

This invention relates to bleeders for hydraulic lines and refers more particularly to an automatic bleeder.

It is understood that when air or other gases must be removed from hydraulic lines a hollow plug is screwed into the line at a point located high in the line where the gas will have accumulated. This plug has a valve surface on its end, which engages a valve seat to seal the line when screwed home. When it is screwed out a bit both gas and liquid rise around the body of the plug in a chamber provided for the purpose, and enter transverse holes in the plug connecting with the central axial exhaust hole. Fresh liquid is being fed into the system, and when the gas has been expelled as will be evident by liquid following it out, the plug is screwed home, sealing the opening, while simultaneously the feeding of new liquid is discontinued. The above process is widely known as "bleeding" the line or system.

The process as now practised requires two men, as the point of location of the plug and of feeding the new liquid are seldom the same, yet the plug must be closed just as the flow of new liquid stops. If one man opens the plug, leaves it to turn on the liquid, then shuts off the liquid at the indicated moment, he finds that before he can get back to the plug to screw it home the liquid has receded and he is back where he started, with air in the line.

An object of the present invention is to provide an automatic bleeder, which will close itself the moment the flow of new liquid into the line ceases.

A further object is to provide an accessory for use with present equipment of bleeding plugs, which will give all the advantages of automatic operation.

A further object is the provision of such means which shall be small, simple and sturdy.

Other objects will become apparent from the following specification.

In accomplishing the objects of the present invention it was found desirable to provide the hollow bleeder plug of the prior art with internal threads and to screw into it a valve body containing a valve seat, a plunger with a valve surface engaging the seat, a spring actuating the plunger and a head threaded into the body and engaging the spring for adjusting its pressure. Vents lead out of the valve body on the outward side of the valve seat, permitting escape of the gases and liquid from the line.

In operation the plug is screwed into its seat in the line and the valve body is screwed into it. The plug may then be unscrewed somewhat, so that the sealing is done by the valve only. The spring pressure has been set so that the valve will permit the escape of gas only, or of gas and liquid under a certain minimum pressure. The operator may now safely leave the bleeder mechanism and operate the liquid feed. After feeding the line until he observes liquid bleeding out or for a time known from experience to be correct, the operator stops feeding the line, and the automatic bleeder closes the bleeding point as soon as the feeding pressure ceases. The operator may now return and remove the automatic bleeder if desired, first tightening the bleeding plug.

The advantage of this automatic synchronising of the closing with the cessation of bleeding is obvious. It is hard enough for two men to obtain perfect synchronisation, and for one man to do so, even if the points at which the two operations were to be carried out were near enough together, would be extremely difficult due to the dissimilarity of movement required simultaneously from his two hands.

The invention will appear more clearly from the following detailed description when taken in consideration with the accompanying drawings showing, by way of example, a preferred embodiment of the inventive idea.

In the drawings:

Figure 5 is a side elevation of the automatic bleeder.

Figure 6 is a vertical longitudinal section of the same.

Figure 7 is a cross section along the broken line 7—7 of Figure 6.

Figure 1:
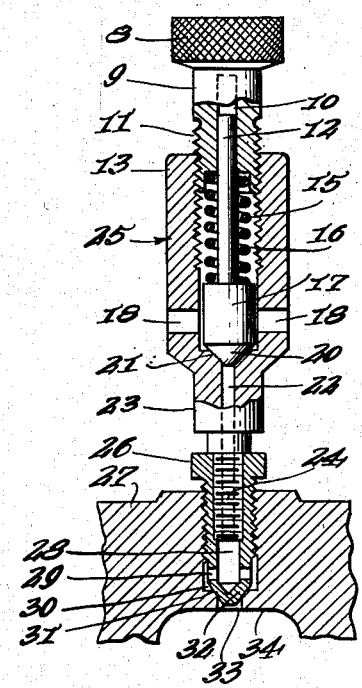
Figure 1 is a vertical longitudinal section of the automatic bleeder and bleeder plug in position, both being closed.
Figure 3:
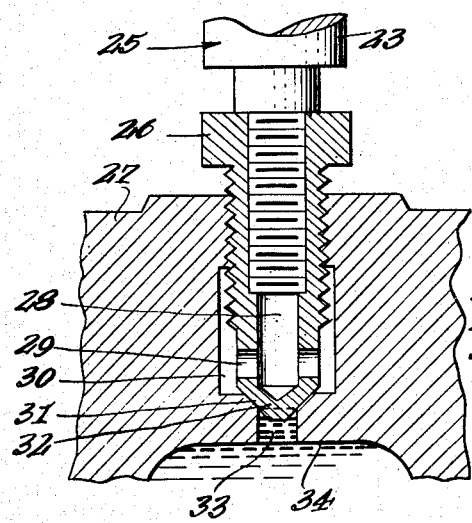
Figures 3 and 4 are enlarged fragments of Figures 1 and 2 respectively.

Figures 1 and 3 show a fragment 27 of the hydraulic line, comprising a dome 34 for the accumulation of the gas, a passage 33 to the plug chamber 30, a valve slot 31 between the two latter, and threads for the bleeder plug 26. The bleeder plug has a valve face 32 engaging valve slot 31, and an axial cylindrical bore 28 extending from the head to a point near the valve face. Transverse holes 29 connect this dead end of the bore to the outside of the plug, leading into the chamber 30. The plug is thus adapted either to seal the hydraulic line, as in Figure 3, or to provide an outlet therefrom via passage 33, chamber 30, holes 29 and bore 28, as in Figure 4, which shows the liquid 35 rising in chamber 30 and about to enter holes 29 as indicated by the arrows.

According to the invention bore 28 is tapped to receive threads 24 of the automatic bleeder 25, Figures 5, 6, 7. The automatic bleeder consists of the substantially cylindrical body 13, which narrows to the smaller cylindrical portion 23 comprising the axial bore 22 adapted to connect with bore 28. The valve seat 21 is at the top of bore 22 and above it is counterbored chamber 16 bearing threads 14. Transverse holes 18 lead from chamber 16 above the valve seat to the exterior of the body. The adjusting head 8 comprises a cylindrical body 9 with an axial bore 10 and external threads 11 engaging threads 14 of the body 13. In the bore 10 slides plunger 12 comprises valve head 17. Spring 15 is wound around plunger 12 and engages adjusting head 8 and valve head 17, this actuating the latter and particularly valve surface 20 thereof into engagement with valve seat 21.

Flat surfaces 19, Figures 5 and 7, provide a grip for a wrench.

Figure 2:
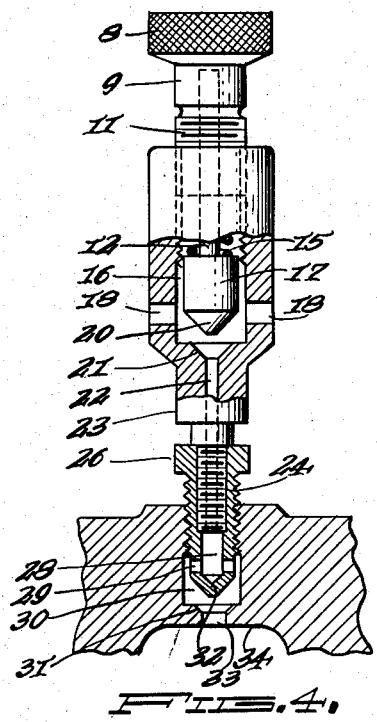
Figure 2 is the same, but both are open.
Figure 4:
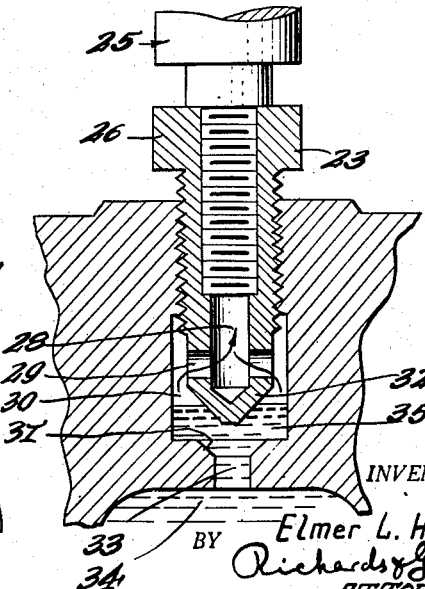

In operation the bleeder plug 26 of prior art is always screwed home as in Figures 1 and 3 except when bleeding, when it is as in Figures 2 and 4. To bleed the line using the automatic bleeder, the automatic bleeder is screwed into the bleeder plug, both bleeder and automatic bleeder being in closed position as in Figure 1. Preparatory to operation the bleeder is opened as in Figure 2, the automatic bleeder remaining closed as in Figure 1.

The operator may now leave the bleeding mechanism and apply new fluid under pressure into the system. The first substance to be expelled from the system will be the air or gas which has collected in the dome 34. The plunger position shown in Figure 1 is still the most accurate illustration of this step of the operation, the valve opening necessary for the escape of gas being almost infinitesimally small.

The pressure of spring 15 has been adjusted to be slightly less than the pressure at which the new fluid is fed to the line, so as this feeding pressure continues, the fluid 35 rises in passage 33, chamber 30, holes 29, bore 28, and enters bore 22, encounters valve head 17 and forces it back, opening automatic bleeder valve as in Figure 2, which shows the opening between valve surface 20 and valve seat 21 much exaggerated for the sake of clarity. The fluid then escapes out holes 18 and the operator observing this cuts off the pressure of new fluid. Spring 15 instantaneously returns surface 20 into engagement with seat 21 and the bleeding is complete and the system sealed once more.

The automatic bleeder is thus disclosed as a type of pressure relief valve adapted to cooperate with the conventional bleeder plug. It may be removed after the latter has been returned to the closed position of Figure 1.

It may also evidently replace the bleeder plug entirely on stationary installations or wherever conditions permit such a projection from the line. In such case thread 24 would fit the threads in the line 27, and the chamber 30 and valve surfaces 31, 32 would be unnecessary.

Whether used as an accessory to the bleeder plug or as a replacement of it, it would comprise only four parts, namely body, head, plunger and spring.

It is apparent that the specific illustrations shown above have been given by way of illustration only and not by way of limitation, and that the structures above described are subject to wide variation and modification without departing from the scope or intent of the invention, all of which variations and modifications are to be included within the scope of the present invention.

What is claimed is:

An automatic bleeder for hydraulic lines and the like in combination with a bleeder plug, the bleeder plug having an externally threaded cylindrical body portion and adapted for threading into a coacting tapped opening in the hydraulic line, the tapped opening being provided with a valve seat at the bottom, the cylindrical body portion further having a valve body disposed at the bottom thereof coacting with the valve seat and a longitudinal bore extending from the upper end toward the lower end, the upper portion of the bore being threaded, and provided with at least one transverse bore between the longitudinal bore and the exterior; the automatic bleeder comprising a substantially cylindrical body portion, the diameter of the cylindrical body portion being less at the bottom than at the top, the body portion of narrow diameter being externally threaded and adapted for removable insertion in the threaded bore of the plug, the body portion of narrow diameter further having an axial bore coacting with the longitudinal bore of the plug when threaded therein, the axial bore terminating at the top in a coacting threaded axial bore of greater diameter, a valve seat between the two axial bores and at least one transverse bore leading from the axial bore of greater diameter to the exterior; the automatic bleeder further comprising a cylindrical adjusting head, said head comprising a second substantially cylindrical body portion and adapted to be threaded into the axial bore of greater diameter of the first cylindrical body portion, the head further having a longitudinal bore extending from the base upwardly, a plunger slidably disposed in the bore, a valve body disposed at the base of the plunger and adapted to coact with the valve seat in the first cylindrical body portion, a spiral spring disposed around the plunger between the valve body and the base of the adjusting head and adapted to exert a downwardly directed force in the valve body.

ELMER L. HART.

REFERENCES CITED

The following references are of record in the file of this patent:

UNITED STATES PATENTS

| Number | Name | Date |
|---|---|---|
| 170,974 | Westwater | Dec. 14, 1875 |
| 314,719 | Reese | Mar. 31, 1885 |
| 415,469 | Porter | Nov. 19, 1889 |
| 429,632 | Martyn | June 19, 1890 |
| 590,195 | Waybright | Sept. 14, 1897 |
| 946,661 | Desmond | Jan. 18, 1910 |
| 1,346,921 | Terry | July 20, 1920 |
| 1,478,584 | Schweinert | Dec. 25, 1923 |
| 1,807,594 | Hopkins | June 2, 1931 |
| 2,064,573 | Tatter | Dec. 15, 1936 |
| 2,069,606 | Gary | Feb. 2, 1937 |

FOREIGN PATENTS

| Number | Country | Date |
|---|---|---|
| 58,437 | Norway | of 1937 |